(12) United States Patent
Lee et al.

(10) Patent No.: US 7,890,641 B2
(45) Date of Patent: Feb. 15, 2011

(54) METHOD FOR CONTROLLING HAVI DEVICE THROUGH NON-IEEE1394 NETWORK AND SYSTEM THEREFOR

(75) Inventors: Min-seok Lee, Pohang-si (KR);
Hyun-gyoo Yook, Seoul (KR);
Kyoung-hoon Yi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 981 days.

(21) Appl. No.: 10/325,819

(22) Filed: Dec. 23, 2002

(65) Prior Publication Data
US 2003/0149811 A1    Aug. 7, 2003

(30) Foreign Application Priority Data
Dec. 24, 2001    (KR)    ................................ 2001-84106

(51) Int. Cl.
*G06F 15/16* (2006.01)
(52) U.S. Cl. ..................................... 709/229
(58) Field of Classification Search ................ 709/203, 709/208, 217–219, 223–224, 230, 238, 246, 709/249, 229; 725/80, 141
See application file for complete search history.

(56) References Cited

U.S. PATENT DOCUMENTS

| | | | | |
|---|---|---|---|---|
| 6,813,715 B2* | 11/2004 | Yi | ................................ | 726/15 |
| 6,850,149 B2* | 2/2005 | Park | ............................ | 340/7.1 |
| 6,993,785 B1* | 1/2006 | Na | ................................ | 725/80 |
| 2002/0066029 A1* | 5/2002 | Yi | ................................ | 713/201 |
| 2002/0078259 A1* | 6/2002 | Wendorf et al. | ............. | 709/328 |

FOREIGN PATENT DOCUMENTS

| | | |
|---|---|---|
| JP | 2001-7861 A | 1/2001 |
| JP | 2001-285371 A | 10/2001 |
| WO | WO 00/76130 A1 | 12/2000 |
| WO | WO 00/76131 A1 | 12/2000 |
| WO | WO 01/76146 A1 | 10/2001 |

* cited by examiner

*Primary Examiner*—Shawki S Ismail
(74) *Attorney, Agent, or Firm*—Sughrue Mion, PLLC

(57) ABSTRACT

A method and apparatus for controlling a device of a HAVi network system through a non-IEEE1394 network are provided. The method for controlling through the non-IEEE1394 network a device which is connected to a Home Audio Video interoperability (HAVi) network system, includes: (a) installing a non-IEEE1394 communications module and a proxy manager in a control device connected to the HAVi network system; (b) installing a havlet and a client proxy in the controller having a non-IEEE1394 communications module; (c) converting a user control command input through the havlet into a HAVi message; (d) packaging the HAVi message into a non-IEEE1394 network message through the client proxy and transmitting the non-IEEE1394 message to the proxy manager through the non-IEEE1394 communication module; and (e) extracting the HAVi message from the received non-IEEE1394 message through the proxy manager and sending the HAVi message to a messaging system installed in the control device. According to the method and apparatus, a device connected to a HAVi network system can be controlled by executing the havlet on the non-IEEE1394 network.

14 Claims, 7 Drawing Sheets

METHOD FOR CONTROLLING HAVI DEVICE THROUGH NON-IEEE1394 NETWORK AND SYSTEM THEREFOR

CROSS-REFERENCE TO RELATED APPLICATIONS

This application is based upon and claims priority from Korean Patent Application No. 01-84106 filed Dec. 24, 2001, the contents of which are incorporated herein by reference.

BACKGROUND OF THE INVENTION

1. Field of the Invention

The present invention relates to a Home Audio Video interoperability (HAVi) network system, and more particularly, to a method and system for controlling a device, which is connected to a HAVi network system designed based on an IEEE1394 network, through a non-IEEE1394 network.

2. Description of the Related Art

Home Audio Video interoperability (HAVi) is a home network standard specification in which a plurality of household electronic products provided by a variety of vendors are connected to one network, and from one product, the user can control other electronic products. The products connected to a HAVi network are referred to as HAVi devices. Among the HAVi devices, a device which is in charge of controlling other devices is referred to as a control device, and the remaining devices which are controlled by the control device are referred to as controlled devices. The physical layer of the HAVi network complies with the IEEE1394 protocol, which supports asynchronous transmission and isochronous transmission. Asynchronous transmission is mainly for transmitting control data, while isochronous transmission is for Audio/Video (AV) data.

FIG. 1 is a simplified diagram of a prior art Home Audio Video interoperability (HAVi) system.

Referring to FIG. 1, HAVi devices 10 and 30 are connected to an IEEE1394 network. Reference number 10 indicates a control device which controls a controlled device indicated by reference number 30.

The control device 10 is a Full Audio Video (FAV) device having a display apparatus (not shown) and includes a Communication Media Manager (CMM) 1394 600 and a messaging system 500. The messaging system 500 delivers HAVi messages between elements, that is, between a Device Control Module (DCM) 400 and a havlet 800, or between the DCM 400 and the controlled device 30. The CMM 1394 600 enables HAVi devices to communicate HAVi messages with each other asynchronously or isochronously based on the IEEE1394 physical layer.

Also, a DCM code unit 200 is installed in the control device 100, and accordingly, the control device 10 includes the DCM 400 and a Function Control Module (FCM) 300. The DCM 400 has information capable of providing the havlet 800. The havlet 800 is an application program based on Java and is downloaded from the DCM 400 and installed in the control device 100. The havlet 800 is a Java application having a menu system for user interface and is executed on a Java Virtual Machine (JVM) 1000 through a HAVi Java Application Program Interface (HJA) 900.

A user control command, which is input through the havlet 800, is transformed into a HAVi message through the messaging system 500 and sent to the DCM 400. A control command or data corresponding to the HAVi message sent to the DCM 400 is sent to the controlled device 30 again through the messaging system 500 and the CMM 1394 600.

In the case that the control device 10 is a digital television (DTV) and the controlled device 30 is a camcorder, if a user inputs a control command for the camcorder through a menu screen, the havlet 800 makes the control command an appropriate HAVi message and sends the message to the DCM 400. The DCM 400 controls the camcorder according to the control command of the received message.

However, since the prior art HAVi network system is built based on the IEEE1394 network, even though a HAVi device is physically or logically connected to an external network, if the external network is not an IEEE1394 network, the HAVi device cannot be controlled. That is, the havlet 800 cannot operate through a non-IEEE1394 network such as Ethernet. Therefore, through a non-IEEE1394 network, the controlled device cannot be controlled.

SUMMARY OF THE INVENTION

To solve the above problems, it is a first object of the present invention to provide a method and system in which a HAVi device connected to a HAVi network system can be controlled even through a non-IEEE1394 network.

It is a second object of the present invention to provide a method and system in which a havlet is made to operate even in a non-IEEE1394 network so that a HAVi device connected to a HAVi network system can be controlled.

In one aspect, the present invention provides a method for controlling through a non-IEEE1394 network a device which is connected to a Home Audio Video interoperability (HAVi) network system, the method comprising: (a) installing a non-IEEE1394 communications module and a proxy manager in a control device connected to the HAVi network system; (b) installing a havlet and a client proxy in the controller having a non-IEEE1394 communications module; (c) converting a user control command input through the havlet into a HAVi message; (d) packaging the HAVi message into a communicable-in-the-non-IEEE1394 network message through the client proxy and transmitting the message to the proxy manager through the non-IEEE1394communication module; and (e) extracting the HAVi message from the received message through the proxy manager and sending the HAVi message to a messaging system installed in the control device.

Preferably, step (b) comprises (b1) the controller downloading the havlet, a HAVi Java Application Program Interface (HJA), and the client proxy from the outside and installing the havlet, HJA, and client proxy.

Preferably, step (b) further comprises (b2) the client proxy downloading the havlet through the proxy manager and installing the havlet in an executable manner. In this case, step (b2) comprises the client proxy downloading HJA for executing the havlet through the proxy manager and installing the HJA.

Preferably, step (d) further comprises (d1) packaging the HAVi message into a non-IEEE1394 packet by adding a non-IEEE1394 header to the HAVi message.

The control method according to the present invention further comprises: (f) the messaging system sending the received HAVi message to a control module which controls the controlled device; and (g) the control module sending a control command corresponding to the HAVi message to the controlled device.

In another aspect, the present invention provides a control device connected to a HAVi network system, the control device comprising: a Communication Media Manager (CMM) 1394; a messaging system; a non-IEEE1394 communications module; a proxy manager which, being connected to a non-IEEE1394 network through the non-IEEE1394 communications module in a communicable manner, and being connected to a client proxy which is installed in a controller having a havlet in an executable manner, in a communicable manner through the non-IEEE1394 network, receives a message from the havlet and sends the received message to the messaging system, and receives a message from the messaging system and transmits the received message to the havlet.

Preferably, the control device further comprises a Device Control Module (DCM) which receives the message sent by the havlet through the messaging system and controls a controlled device corresponding to the message.

Preferably, the proxy manager comprises an Application Program Interface (API) which generates a network connection to the client proxy and gives an identifier to the client proxy, an API which provides information on havlets to the client proxy, an API which provides a Havlet Code Unit for installing the havlets, and an API which after the havlet is executed, enables communications between the havlet and other devices or elements connected to the HAVi network system.

In another aspect, the present invention provides a controller comprising: a non-IEEE1394 communications module; a Java virtual machine; and a client proxy which downloads a havlet from the outside and installs the havlet in an executable manner.

Preferably, the client proxy downloads a havlet from a proxy manager installed in a control device of a HAVi network system and installs the havlet in an executable manner. In this case, the client proxy comprises a havlet installation module, which downloads and installs the havlet, and a transfer module, which transfers the operation of the havlet to a proxy manager installed in a control device of a HAVi network system. The transfer module packages a HAVi message from the havlet into a non-IEEE1394 packet, which is transmitted through a non-IEEE1394 network, and transfers the packet to the proxy manager through the non-IEEE1394 network.

The controller according to the present invention further comprises a HAVi Java API or a Java byte code which is needed in executing the havlet.

In the controller according to the present invention, preferably, the client proxy has an API for receiving an asynchronous message.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Figure 1:
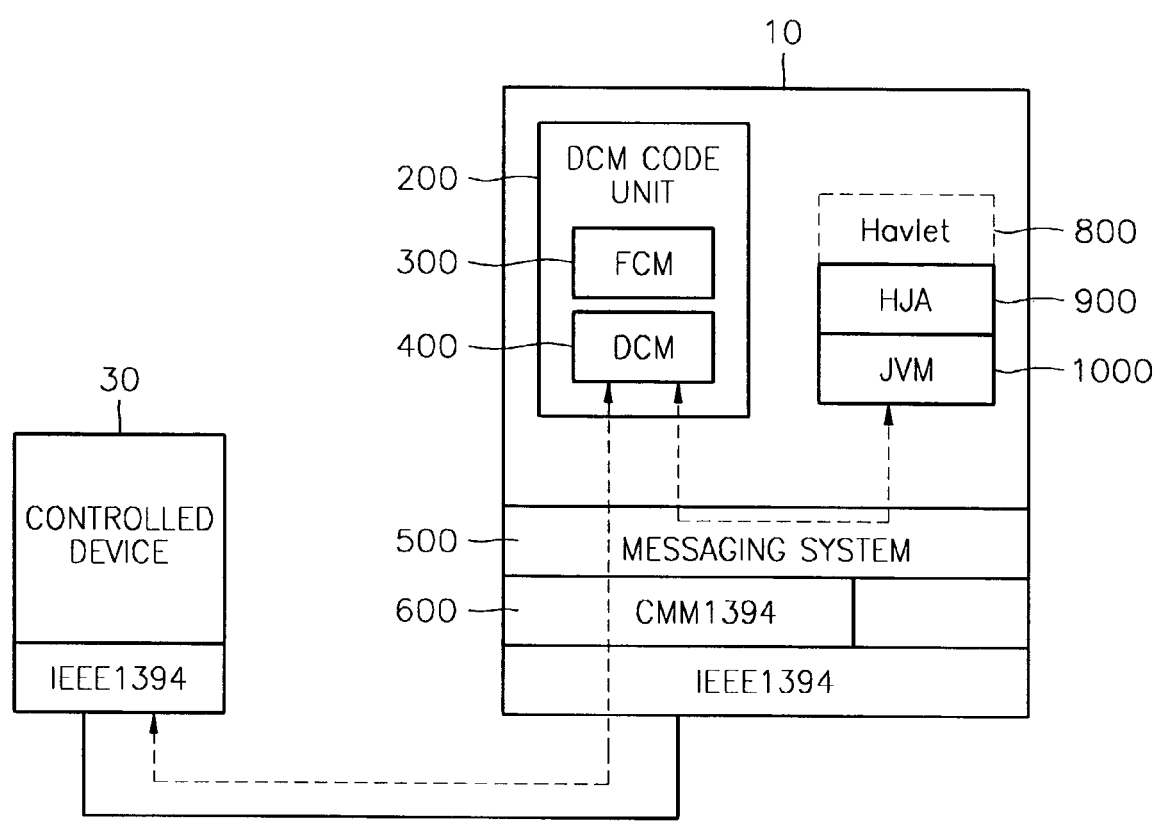
FIG. 1 is a simplified diagram of a prior art Home Audio Video interoperability (HAVi) system.
Figure 2:
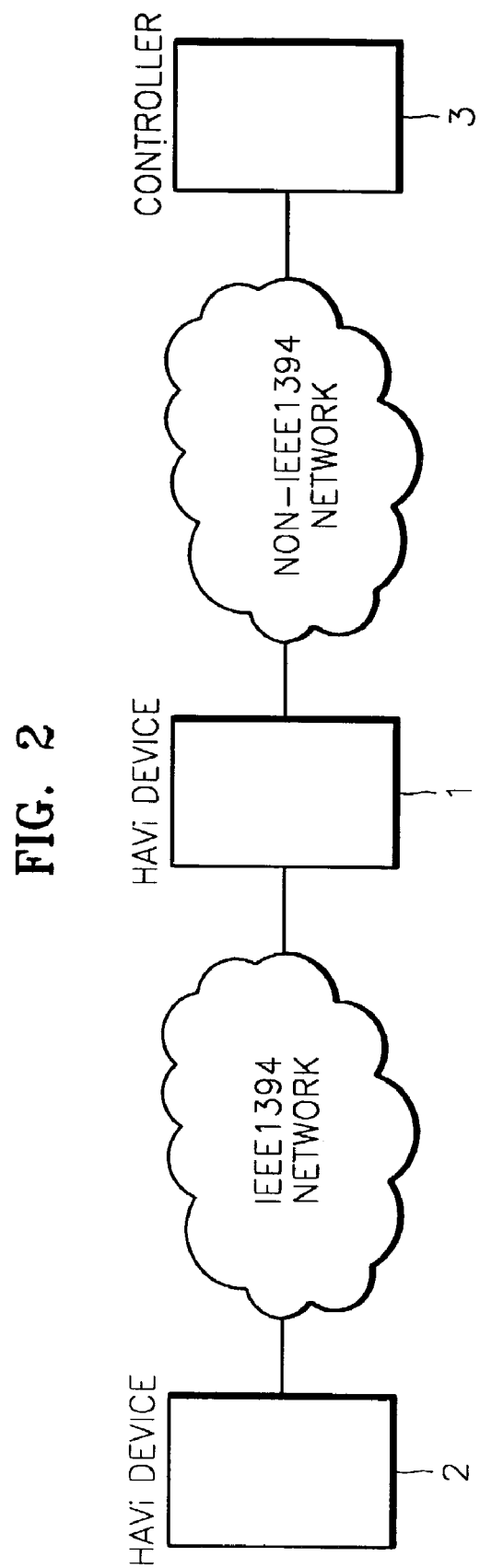
FIG. 2 is a simplified diagram of a network system according to a preferred embodiment of the present invention.

Referring FIG. 2, HAVi devices 1 and 2 are connected to an IEEE1394 network. The HAVi device indicated by reference number 2 is a controlled device. The HAVi device indicated by reference number 1 is a control device and is also connected to a non-IEEE1394 network in a communicable manner. The non-IEEE1394 network is a communications network that does not use the IEEE1394 protocol in physical layer communications, for example, Ethernet. By executing a havlet, a controller 3 transmits a control command input by a user to the control device 1 through the non-IEEE1394 network and receives a response to the command from the control device 1 through the non-IEEE1394 network.

Figure 3:
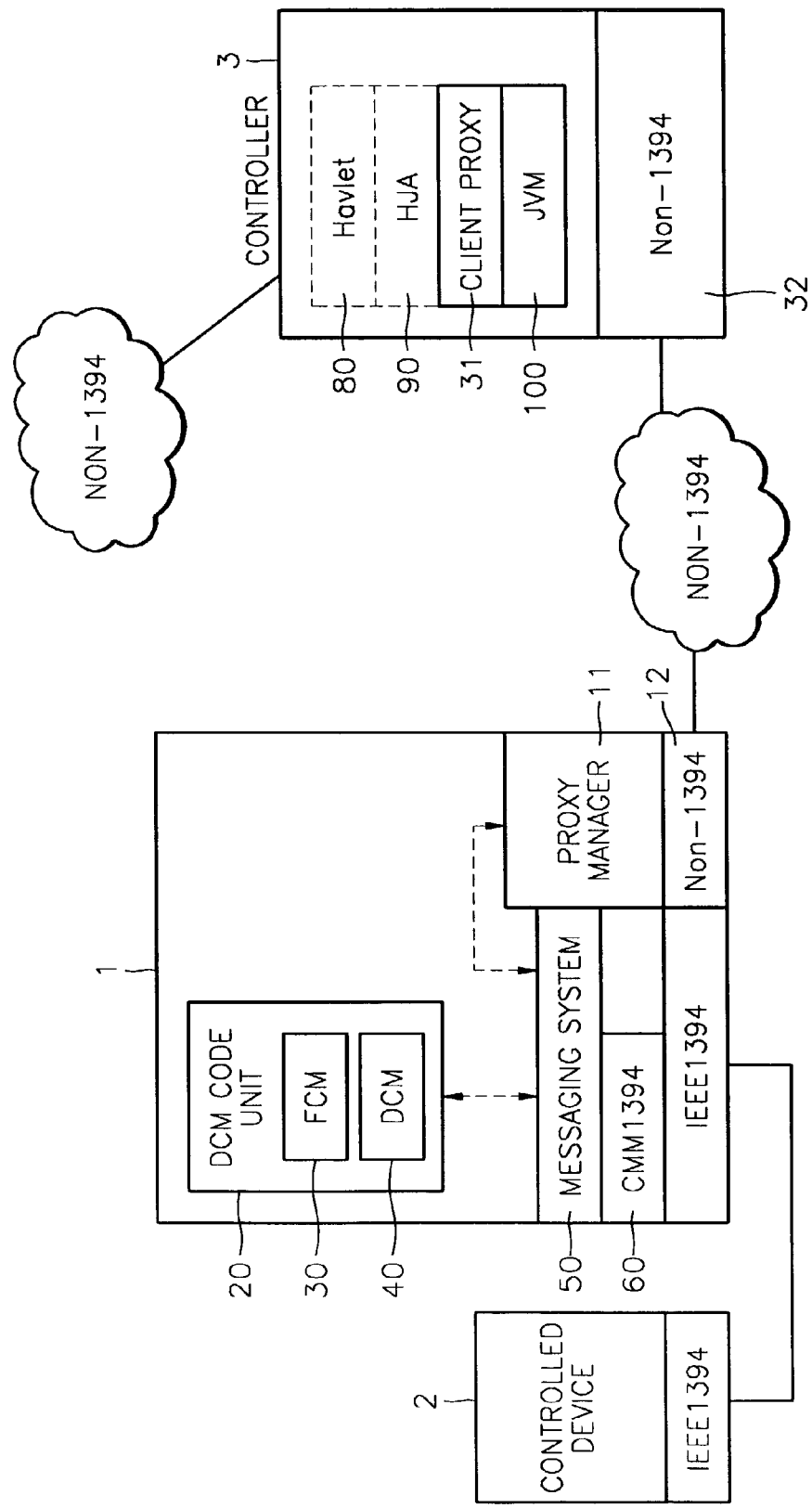
FIG. 3 is an example of an implementation of FIG. 2.

FIG. 3 is an example of an implementation of FIG. 2.

Referring to FIG. 3, the control device 1 is a FAV device having a display apparatus (not shown) and has a CMM 1394 60 and a messaging system 50. The messaging system 50 delivers HAVi messages between elements, and the CMM 1394 60 makes the HAVi devices 1 and 2 communicate HAVi messages with each other asynchronously or isochronously based on the IEEE1394 physical layer. In addition, the control device 1 has a DCM 40 and an FCM 30 by installing a DCM code unit 20. The DCM 40 contains information capable of generating a havlet 80 which can control the controlled device 2.

Furthermore, according to the present invention, a proxy manager 11 and a non-IEEE1394 communication module 12 which supports a non-IEEE1394 physical layer are installed in the control device 1. The proxy manager 11 provides the havlet 80 to the controller 3 through the non-IEEE1394 network. Also, the proxy manager 11 extracts a HAVi message from a non-IEEE1394 packet transmitted by the controller 3, sends the HAVi message to the messaging system 50, and packages the HAVi message, which is sent by the messaging system 50, into a non-IEEE1394 packet.

Installed in the controller 3 is a non-IEE1394 communication module 32 for communications through a non-IEEE1394 network and a Java Virtual Machine (JVM) for executing the havlet 80. Also in the controller 3, a client proxy 31 is installed according to the present invention. The client proxy 31 is formed with a havlet installing module (not shown), which downloads and installs the havlet 80, and a transfer module (not shown), which transfers the operation of the havlet 80 to the proxy manager 11. The havlet installing module functions as a container for downloading and then installing the havlet 80 and should be installed in advance. The transfer module can be installed in advance, downloaded from the outside and installed, or downloaded from the proxy manager 11 and executed. However, if there is a container capable of executing the havlet 80 in the controller 3, that is, if an environment for executing Java is provided (e.g., a web browser capable of interpreting and executing Java is installed), Java applets may be downloaded from the proxy manager 11 or from the outside and dynamically executed. The transfer module packages the HAVi message provided by the havlet 80 into a non-IEEE1394 packet that can be transferred through a non-IEEE1394 network.

The havlet 80 is an application which provides a user interface for controlling the controlled apparatus 2. The havlet is prepared corresponding to the controlled apparatus 2.

That is, if the controlled apparatus 2 is a camcorder, the corresponding havlet 80 provides a user interface having a menu screen needed in controlling the camcorder. HAVi Java API (HJA) or a Java byte code which is needed in executing the havlet 80 is installed in the controller 3 in advance, or at execution time, is dynamically downloaded from the proxy manager 11 or from the outside and then executed. By doing so, the havlet 80 can be executed in the controller 3 connected to the non-IEEE1394 network.

Figure 4:
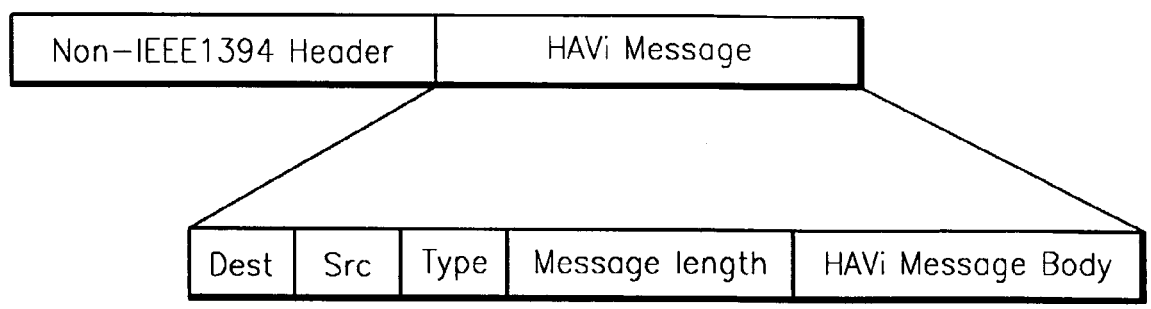
FIG. 4 is a diagram of the data structure of a non-IEEE1394 packet according to a preferred embodiment of the present invention.

FIG. 4 is a diagram of the data structure of a non-IEEE1394 packet which is packaged by the transfer module of the client proxy 31 and the proxy manager 11.

The non-IEEE1394 packet is formed with a non-IEEE1394 header and a HAVi message. The non-IEEE1394 header contains the address (or identifier) of the client proxy 31 as source information and the address (or identifier) of the proxy manager 11 as destination information. In addition, header information such as an error correction code may be added. The HAVi message is formed with source information (Src), destination information (Dest), message type information (Type), message length information (Message length), and message body (HAVi Message Body).

Application Program Interfaces (APIs) for implementing the present invention will now be explained. APIs used in the present embodiment can be divided into an API for the proxy manager 11, an API for the client proxy 31, and an API for the DCM code unit 20. The proxy manager API includes Connect( ), Close( ), getHaveletList(clientId), getHavletCodeUnit(clientId, havletId), getHaveltCodeUnitProfile(clientId, havletId), and sendMessage(clientId, msg). The client proxy API is Notification(clientId, msg). The DCM code unit API includes Dcm::getHavletCodeUnitProfile and DCM::getHavletCodeUnit. Each of these will now be explained.

1. Proxy Manger API

The Connect( ) establishes a network connection between the proxy manager 11 and the client proxy 31 and gives an identifier ID to the client proxy 31.

The Close(clientId) has client proxy 31 identifier 'client Id' as a parameter and terminates the connection between the proxy manager 11 and the client proxy 31.

The getHaveletList(clientId) has client proxy 31 identifier 'client Id' as a parameter and returns information on the havlets existing in the HAVi network system. With this, information on havlets is provided to the client proxy 31 so that the client proxy 31 can select an appropriate havlet.

The getHavletCodeUnit(clientId, havletId) has client proxy 31 identifier 'clientId' and havlet identifier 'havletId' as parameters. Havlet identifier 'havletId' indicates the identifier ID of a havlet which is desired to be installed in the havlet information, Havlet List, which is obtained by getHavletList. This API returns a Havlet Code Unit for installing the desired havlet. The client proxy 31 calls this API to obtain the Havlet Code Unit, and the proxy manager 11 then calls DCM::getHavletCodeUnit API which will be explained below, and transmits the received HavletCodeUnit to the client proxy 31 through the non-IEEE1394 network.

The getHavletCodeUnitProfile(clientId, havletId) has client proxy 31 identifier 'clientId' and havlet identifier 'havletId' as parameters. Havlet identifier 'havletId' has the identifier ID of the havlet desired to be installed in the Havlet List obtained by getHavletList. This API returns HavletCodeUnitProfile which is information needed in determining whether or not corresponding Havlet Code Unit can be installed. The client proxy 31 calls the controller 3 in order to obtain information needed in determining whether or not installing Havlet Code Unit in the controller 3 is possible. The proxy manager 11 transmits HavletCodeUnitProfile, which is obtained by calling DCM::getHavletCodeUnitProfile, which will be explained below, to the client proxy 31 through the non-IEEE1394 network.

The sendMessage(clientId, msg) has client proxy 31 identifier 'clientId' and HAVi message 'msg', which the havlet 80 desires to transmit to the DCM code unit 20, as parameters. This API returns the result of the havlet 80 processing the message. After the havlet 80 is executed, this is called for communications between the havlet 80 and the DCM 40, or HAVi devices or elements connected to other HAVi network system.

2. Client Proxy API

The NotifyMessage(clientId, msg).has client proxy 31 identifier 'clientId' and events or asynchronous message 'msg', which occurs in the HAVi network system, as parameters. This API returns information on whether or not a message was successfully transmitted. In the HAVi network system, asynchronous messages to the client proxy 31, including events and CMM 1394 60 notification, are generated, and these are transmitted to the client proxy 31.

3. DCM API

The DCM::GetHavletCodeUnit(in long firstByte, in long lastByte, out sequenc<octet>byteArray) has as parameters, 'firstByte', which is the number of the first byte of a havlet byte code unit array desired to be received; 'lastByte', which is the number of the last byte desired to be received; and 'byte array', which is what it is requested to send back. When this API is called, information on whether or not transmission was successful is returned. This provides a havlet code unit in order to install and execute the havlet 80, which is a level 2 application stored in the DCM 40.

The DCM::GetHavletCodeUnitProfile(out Version version, out long transfersize, out long codeSpace, out long workingSpace, out long chunkSize) has as parameters, 'version', which is a minimum version of the messaging system 50 requested by the havlet 80; 'transferSize', which is the size of a havlet code unit byte to be transmitted (that is, the JAR file size); 'codeSpace', which is the number of bytes needed in installing the havlet code unit; 'workingSpace', which is a working space needed by the installed havlet code unit; and 'chunkSize', which is the maximum number of the havlet code unit bytes that can be transmitted in a time. This API provides information for determining whether or not the havlet 80 can be installed and executed.

Based on the structure explained above, a method for controlling a controlled device connected to the HAVi network system through the non-IEEE1394 network according to a preferred embodiment of the present invention will now be explained.

Figure 5:
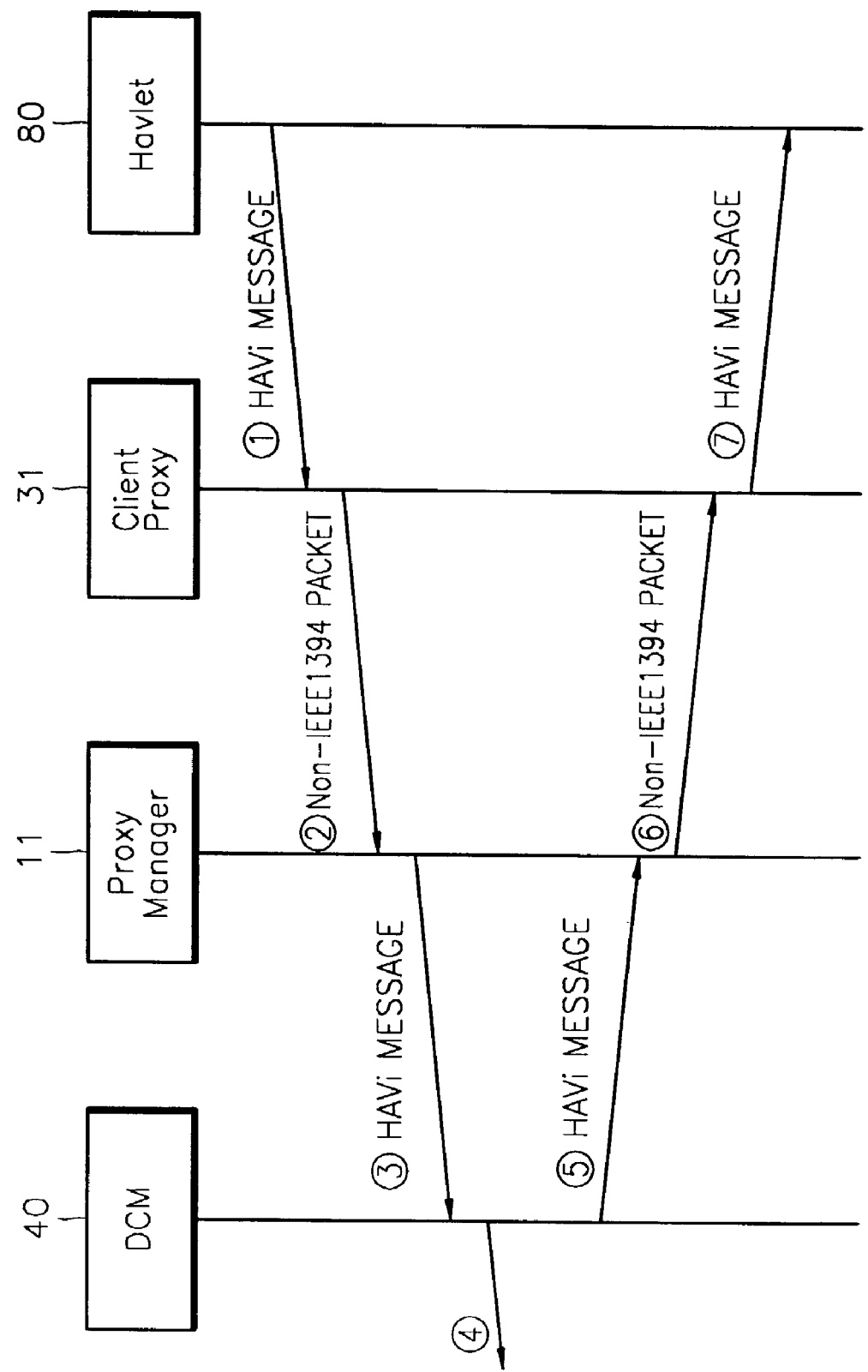
FIG. 5 is a reference diagram for explaining a method for controlling a controlled device through a non-IEEE1394 network according to a preferred embodiment of the present invention.

FIG. 5 is a reference diagram for explaining a method for controlling a controlled device through a non-IEEE1394 network according to a preferred embodiment of the present invention.

Referring to FIG. 5, the havlet 80 is installed in the controller 3 in an executable manner. If the user requests to execute the havlet 80, the havlet 80 is executed such that a menu system is displayed for the user. If the user inputs a control command for executing a predetermined function, the havlet 80 converts this into a HAVi message and sends the message to the client proxy 31 in step 1. The client proxy 31 packages the HAVi message into a non-IEEE1394 packet and transmits the packet to the proxy manager 11 through the non-IEEE1394 network in step 2. The proxy manager 11 unpackages the received non-IEEE1394 packet, extracts the HAVi message, and sends the extracted HAVi message to the DCM 40 through the messaging system 50 in step 3. The DCM 40 transmits the control command corresponding to the received HAVi message to the controlled device 2 through the messaging system 50, the CMM 1394 60, and the IEEE1394 module in step 4. Also, the DCM 40 converts the response from the controlled device 2, according to the control command, into a HAVi message and sends the HAVi message to the proxy manager 11 through the messaging system 50 in step 5. The proxy manager 11 packages the received HAVi message into a non-IEEE1394 packet and transmits the packet to the client proxy 31 through the non-IEEE1394 network in step 6. The client proxy 31 unpackages the received non-IEEE1394 packet, extracts the HAVi message, and sends the HAVi message to the havlet 80 in step 7.

Figure 6:
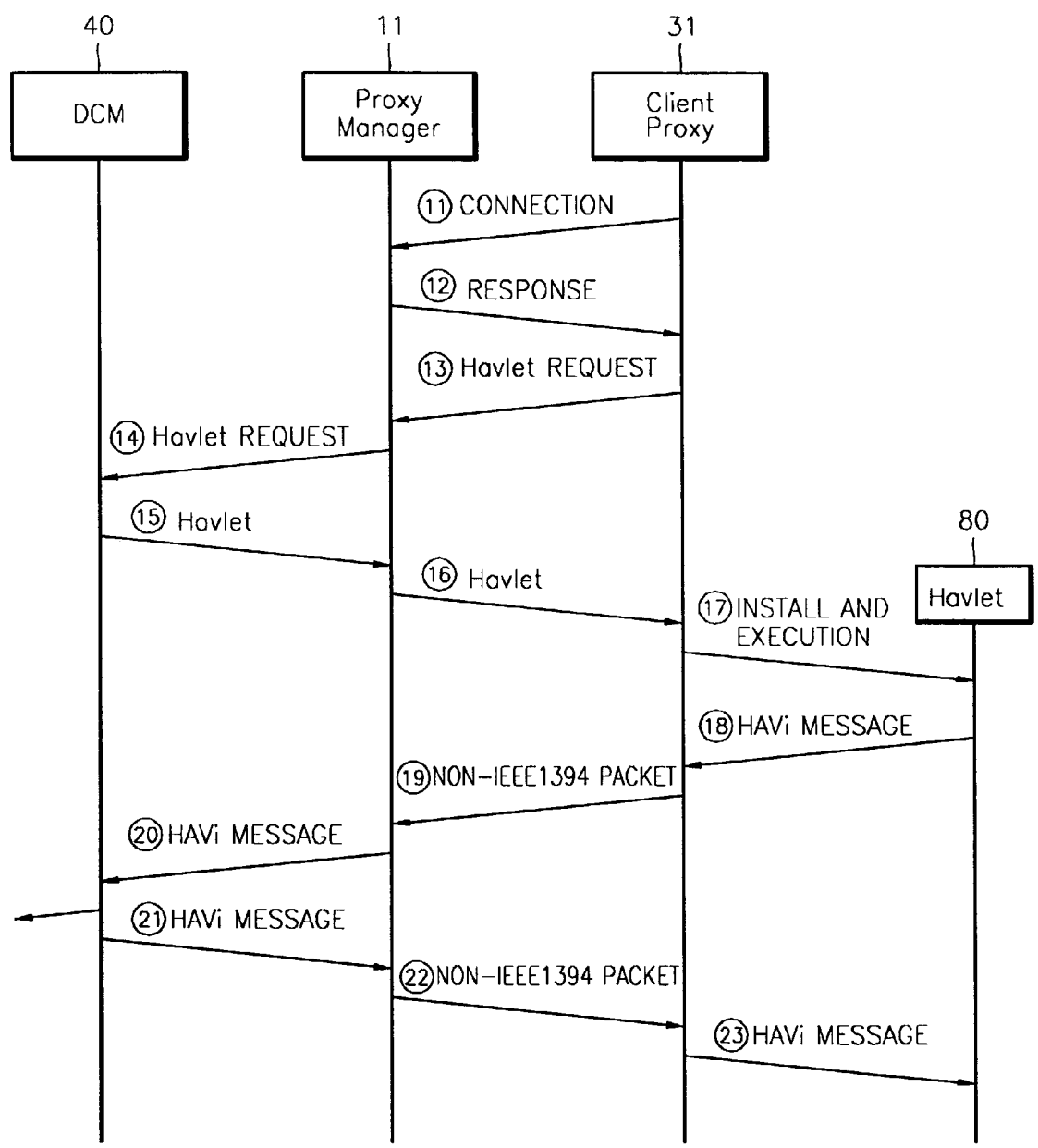
FIG. 6 is a reference diagram illustrating a process of installing a havlet according to a preferred embodiment of the present invention.

FIG. 6 is a reference diagram for explaining a process of installing a havlet according to a preferred embodiment of the present invention.

Referring to FIG. 6, the havlet installation module of the client proxy 31 requests the proxy manager for a connection in step 11. As the proxy manager 11 responds, a connection is established in step 12. Then, the client proxy 31 requests the proxy manager 11 for the havlet 80 in step 13. The proxy manager 11 requests the DCM 40 for the havlet 80 in step 14 and transmits the havlet 80, which is received from the DCM 40 in step 15, to the client proxy 31 in step 16. The havlet installation module of the client proxy 31 installs and executes the received havlet 80 in step 17. Steps 18 through 23 are the same as explained above with reference to steps 1-7 of FIG. 5 and, accordingly, will be omitted. In steps 15 and 16, HJA 90 and Java byte code may be provided together or, as described above, they may be downloaded from other sources and installed or, at the time of installing or executing the havlet 80, may be dynamically downloaded.

Figure 7:
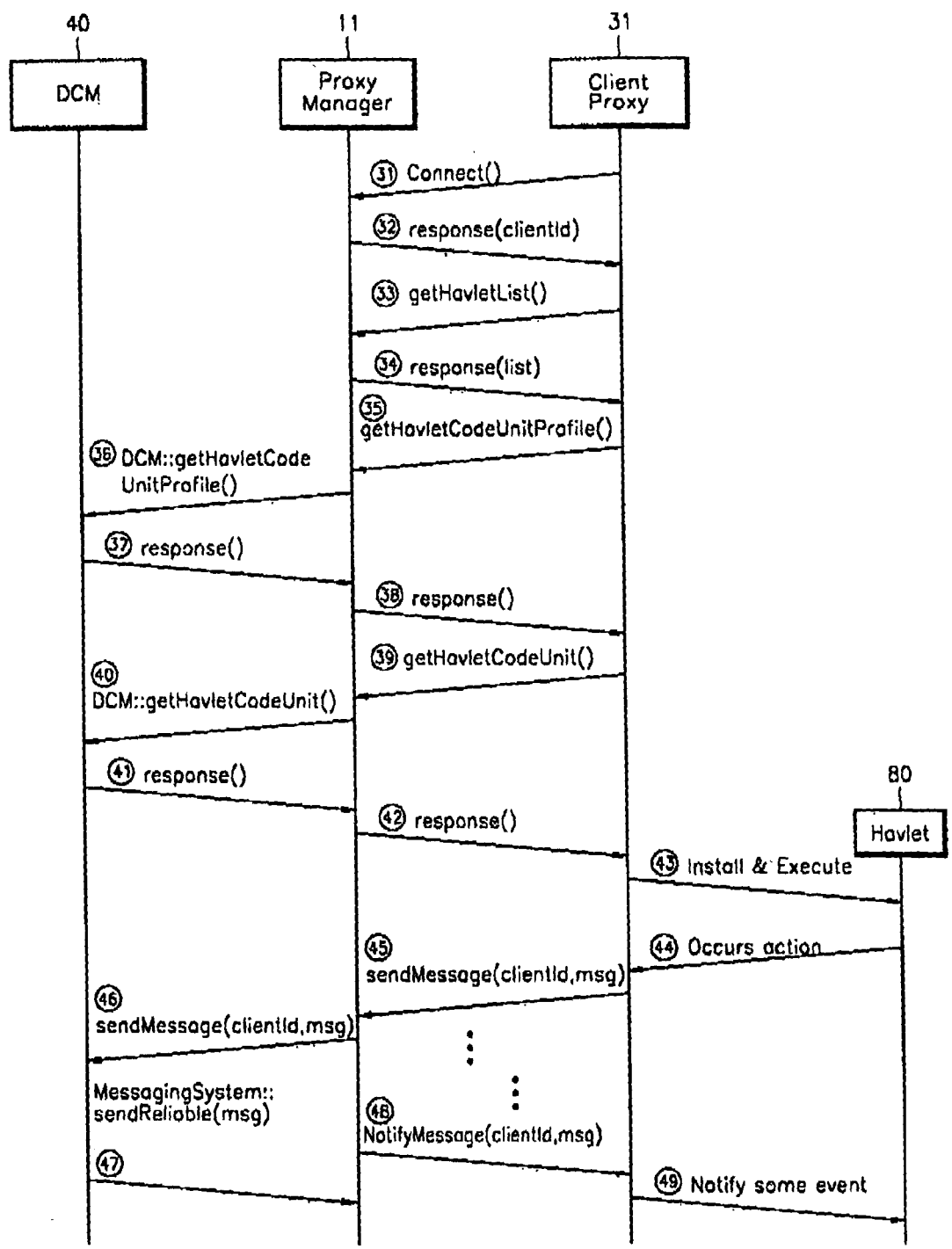
FIG. 7 is a reference diagram illustrating a method for controlling a controlled device through havlet, including a process for installing the havlet based on an Application Program Interface (API).

FIG. 7 is a reference diagram for explaining a method for controlling a controlled device through the havlet 80, including a process for installing the havlet 80 based on the APIs described above.

Referring to FIG. 7, the client proxy 31 calls Connect( ) and requests a connection to the proxy manager 11 in step 31, and from the response of the proxy manager 11, response (clientId), a network connection is established in step 32. If the client proxy 31 calls getHavletList( ) in step 33, the proxy manager 11 provides a list using response (list) in step 34. If the client proxy 31 calls getHavletcodeUnitProfile( ) in step 35, the proxy manager 11 requests the DCM 40 for the profile by calling DCM::GetHavletCodeUnit( ) in step 36, receives the corresponding profile with response( ) in step 37, and transmits the profile to the client proxy 31 using response( ) in step 38. The client proxy 31 confirms the profile. If it is determined that installation is possible, the client proxy 31 calls getHavletCodeUnit( ) in step 39. Then, the proxy manager 11 requests for the Havlet Code Unit needed in installing the havlet 80 by calling DCM::GetHavletCodeUnit( ) in step 40, receives Havlet Code Unit using response( ) in step 41, and transmits Havlet Code Unit to the client proxy 31 using response( ) in step 42. Then, the client proxy 31 installs the havlet 80 in the controller and executes the havlet 80 in step 43. If the havlet 80 receives a control command from the user and sends the control command as a HAVi message to the client proxy 31 in step 44, the client proxy 31 calls sendMessage(clientId, msg) and transmits the non-IEEE1394 packet to the proxy manager 11 in step 45. The proxy manager 11 extracts the HAVi message from the non-IEEE1394 packet and sends the message to the DCM 40 by using MessagingSystem::sendReliable(msg) in step 46. Accordingly, the DCM 40 controls the controlled device 2 and sends the result to the proxy manager 11 by using MessagingSystem::sendReliable(msg) in step 47. The proxy manager 11 transmits the result to the client proxy 31 by calling notifyMessage (clientId, msg) in step 48. The client proxy 31 notifies the corresponding event to the havlet in step 49.

As described above, according to the present invention, the controlled device connected to the HAVi network system can be controlled by executing the havlet on the non-IEEE1394 network. That is, by executing the havlet, which is an application movable based on Java, in the non-IEEE1394 network in which a Java Virtual Machine (JVM) is installed, the havlet already coded can be reused without further modification.

What is claimed is:

1. A method for controlling through a non-IEEE1394 network a device which is connected to a Home Audio Video interoperability (HAVi) network system, the method comprising:

(a) installing a non-IEEE1394 communications module and a proxy manager in a control device connected to the HAVi network system;

(b) installing a havlet and a client proxy in the controller having a non-IEEE1394 communications module;

(c) converting a user control command input through the havlet into a HAVi message;

(d) packaging the HAVi message into a non-IEEE1394 network message through the client proxy and transmitting the non-IEEE1394 network message to the proxy manager through the non-IEEE1394 communication module; and (e) extracting the HAVi message from the non-IEEE1394 network message through the proxy manager and sending the HAVi message to a messaging system installed in the control device, wherein the proxy manager comprises a first Application Program Interface (API) which generates a network connection to the client proxy and provides an identifier to the client proxy, a second API which provides information on havlets to the client proxy, a third API which provides a havlet Code Unit for installing the havlets, and a fourth API which after the havlet is executed, enables communications between the havlet and other devices or elements connected to the HAVi network system.

2. The method of claim 1, wherein step (b) comprises:

(b1) downloading to the controller the havlet, a HAVi Java Application Program Interface (HJA), and the client proxy from an external source and installing the havlet, the HJA, and the client proxy in the controller.

3. The method of claim 1, wherein step (b) further comprises:

(b2) the client proxy downloading the havlet through the proxy manager and installing the havlet in an executable manner.

4. The method of claim 3, wherein step (b2) comprises:

the client proxy downloading an HJA for executing the havlet through the proxy manager and installing the HJA.

5. The method of claim 1, wherein step (d) further comprises:

(d1) packaging the HAVi message into a non-IEEE1394 packet by adding a non -IEEE1394 header to the HAVi message.

6. The method of claim 1, further comprising:

(f) the messaging system sending the HAVi message to a control module which controls the controlled device; and (g) the control module sending a control command corresponding to the HAVi message to the controlled device.

7. A control device connected to a Home Audio Video interoperability (HAVi) network system, the control device comprising:
- a display apparatus;
- a messaging system;
- a non-IEEE1394 communications module;
- a proxy manager connected in a communicable manner through the non-IEEE1394 communications module to a non-IEEE1394 network, and connected in a communicable manner through the non-IEEE1394 network to a client proxy which is installed in a controller having a havlet in an executable manner,
- wherein said proxy manager receives a first non-IEEE1394 network message from the havlet, extracts a first HAVi message from the first non-IEEE1394 network message, sends the first HAVi message to the messaging system, receives a second HAVi message from the messaging system and transmits the second HAVi message in a second non-IEEE1394 message to the havlet,
- wherein the proxy manager comprises a first Application Program Interface (API) which generates a network connection to the client proxy and provides an identifier to the client proxy, a second API which provides information on havlets to the client proxy, a third API which provides a havlet Code Unit for installing the havlets, and a fourth API which after the havlet is executed, enables communications between the havlet and other devices or elements connected to the HAVi network system.

8. A controller comprising:
- a processor;
- a non-IEEE1394 communications module for communications through a non-IEEE1394 network;
- a Java virtual machine for executing a havlet; and
- a client proxy which downloads the havlet from an external source and installs the havlet in an executable manner, wherein the havlet converts a user control command into a HAVi message and sends the HAVi message to the client proxy, and the client proxy packages the HAVi message into a non-IEEE1394 network message which is transmitted through the non-IEEE194 network by the non-IEEE1394 communications module,
- wherein the client proxy downloads the havlet from a proxy manager installed in a control device of a Home Audio Video interoperability (HAVi) network system and installs the havlet in an executable manner, wherein said client proxy is connected in a communicable manner to the proxy manager through the non-IEEE1394 network, and
- wherein the proxy manager comprises a first Application Program Interface (API) which generates a network connection to the client proxy and provides an identifier to the client proxy, a second API which provides information on havlets to the client proxy, a third API which provides a havlet Code Unit for installing the havlets, and a fourth API which after the havlet is executed, enables communications between the havlet and other devices or elements connected to the HAVi network system.

9. The controller of claim 8, wherein the client proxy comprises a havlet installation module which downloads and installs the havlet, and a transfer module which transfers the operation of the havlet to the proxy manager installed in the control device of the HAVi network system.

10. The controller of claim 9, wherein the transfer module packages the HAVi message from the havlet into the non-IEEE1394 packet, and transfers the non-IEEE1394 packet to the proxy manager through the non-IEEE1394 network.

11. The controller of claim 8, further comprising:
- a HAVi Java Application Program Interface or a Java byte code which is needed in executing the havlet.

12. The controller of claim 8, wherein the client proxy has an Application Program Interface (API) for receiving an asynchronous message.

13. The controller of claim 8, wherein the client proxy has an API for receiving an asynchronous message.

14. The controller of claim 9, wherein the client proxy has an API for receiving an asynchronous message.

* * * * *